United States Patent [19]

Shimizu

[11] Patent Number: 5,386,879
[45] Date of Patent: Feb. 7, 1995

[54] STEERING ANGLE RATIO VARYING DEVICE FOR A VEHICLE
[75] Inventor: Tasuo Shimizu, Saitama, Japan
[73] Assignee: Honda Giken Kogyo Kabushiki Kaisha, Tokyo, Japan
[21] Appl. No.: 192,577
[22] Filed: Feb. 7, 1994
[30] Foreign Application Priority Data
    Feb. 8, 1993 [JP] Japan .................. 5-044699
[51] Int. Cl.$^6$ .............................................. B62D 3/12
[52] U.S. Cl. ........................................ 180/79; 74/397
[58] Field of Search ............... 180/790, 793; 464/102, 464/103, 104, 105; 74/390, 395, 396, 397, 398, 399

[56] References Cited

U.S. PATENT DOCUMENTS

| 3,716,110 | 2/1973 | Fonda | 180/79 |
| 5,174,407 | 12/1992 | Shimizu et al. | 180/79 X |
| 5,203,421 | 4/1993 | Ueno et al. | 180/79 X |
| 5,284,219 | 2/1994 | Shimizu et al. | 180/79 X |

FOREIGN PATENT DOCUMENTS 3830654 11/1989 Germany ..................... 180/79.3

Primary Examiner—Margaret A. Focarino
Assistant Examiner—Kevin Hurley
Attorney, Agent, or Firm—Nikaido, Marmelstein, Murray & Oram

[57] ABSTRACT

In a steering angle ratio varying device for a vehicle adapted to be connected in series with a steering input shaft, a first shaft on an input end and a second shaft on an output end are supported in a mutually parallel and laterally moveable relationship, and a crank pin extending from the second shaft is engaged in a diagonal slot provided in an associated axial end of the first shaft. Because the radial distances of the point of engagement between the first and second shafts as measured from the axial center lines of the first and second shafts generally differ from each other, there is a nonlinear relationship between the angular displacements of the first and second shafts. In particular, the angular increment of the second shaft for a given angular increment of the second shaft may be progressively reduced as the angular displacement of the first shaft is increased, and by suitably varying the eccentricity between the two shafts it is possible to require only a relatively small steering input angle for an improved maneuverability in a low speed range, and to prevent an overly sensitive behavior of the vehicle for an improved stability in a high speed range.

6 Claims, 9 Drawing Sheets

STEERING ANGLE RATIO VARYING DEVICE FOR A VEHICLE

TECHNICAL FIELD

The present invention relates to a steering angle ratio varying device for a vehicle which can vary a ratio of a steering angle of steerable wheels to a steering angle of a steering wheel, or a steering angle ratio.

BACKGROUND OF THE INVENTION

In recent years, most automotive steering devices generally use a rack and pinion mechanism as illustrated in FIG. 8. As well known in the art, a rotational movement of a pinion 4, which is connected, via a connecting shaft 3 including a universal joint, to a steering shaft 2 integrally carrying a steering wheel 1, is converted into a linear movement of a rack 5 meshing with the pinion 4, and the linear movement of the rack 5 is in turn converted into a steering movement of steerable wheels or front wheels 8 via tie rods 6 and knuckle arms 7.

According to such a conventional steering device, the steering angle of the steerable wheels has a linear steering property, or, in other words, changes substantially linearly with the rotational angle of the steering wheel, but, in terms of the maneuverability of the vehicle, the rotational angle of the steering wheel for achieving a maximum steering angle of the steerable wheels is desired to be relatively small. Thus, when the steering angle property is set as indicated by a chain-dot line v of FIG. 9, the rotational angle of the steering wheel is kept small, and a favorable maneuverability can be achieved in a low speed range. However, in a high speed range, the behavior of the vehicle becomes excessively sensitive to the steering angle of the steering wheel, and the vehicle operator is required to be careful not to excessively turn the steering wheel. This is because the relation between the steering angle of the steering wheel and the behavior of the vehicle is not fixed, but the yaw response of the vehicle to a given steering input depends on the vehicle speed. For instance, as the vehicle speed increases, the yaw response of the vehicle tends to become increasingly more sensitive.

For this reason, the steering property is generally determined so that the maximum steering angle of the road wheels may be achieved when the steering wheel is turned by 1.5 turns in either direction from its neutral position, and the stability of the vehicle in a high speed range may be ensured (refer to the fine solid line w of FIG. 9).

However, when the actual steering wheel steering angle is measured in relation to the vehicle speed, it can be found that the steering angle at the steering wheel tends to be excessive in a low speed range as indicated by the solid fine line x of FIG. 10.

BRIEF SUMMARY OF THE INVENTION

In view of such problems of the prior art, a primary object of the present invention is to provide a steering angle ratio varying device for a vehicle which can maintain the relationship between the steering angle at the steering wheel and the behavior of the vehicle substantially constant without regard to the travelling speed of the vehicle.

A second object of the present invention is to provide a steering angle ratio varying device for a vehicle which provides a large steering angle with a relatively small steering input angle for an improved maneuverability in a low speed range, and prevents an overly sensitive behavior of the vehicle for an improved stability in a high speed range.

These and other objects of the present invention can be accomplished by providing a steering angle ratio varying device for a vehicle adapted to be connected between an input shaft for applying a steering input and an output shaft from which a steering output is obtained, comprising: a first shaft rotatably supported by a first support member; a second shaft rotatably supported by a second support member in parallel relationship to the first shaft; adjustment means for moving the second support member relative to the first support member so that an axial center line of the second shaft may be moveable laterally in a plane containing an axial center line of the first shaft while maintaining both of the axial center lines in parallel with each other; and crank arm means which transmits angular movement of one of the first and second shafts to the other at a point radially offset from the axial center lines of the first and second shafts.

When the first shaft is connected to the input shaft, the second shaft is connected to the output shaft, and vice versa.

According to such a structure, when the second shaft is moved in parallel to the first shaft, the eccentricity between the first shaft and the second shaft changes continually. Since the radial distances of the point of engagement between the first and second shafts as measured from the axial center lines of the first and second shafts generally differ from each other, there is a nonlinear relationship between the angular displacements of the first and second shafts. In particular, for instance, the angular increment of the second shaft for a given angular increment of the second shaft may be progressively reduced as the angular displacement of the first shaft is increased, and a desired steering angle ratio can be obtained by suitably varying the eccentricity between the two shafts. Obviously, the first and second shafts are interchangeable as long as the desired input and output relationship is obtained.

According to a preferred embodiment of the present invention, the crank arm means comprises a crank pin extending integrally from and in parallel with the second shaft, and a diagonal groove provided in an associated end face of the first shaft and slidably receiving the crank pin substantially without any play. Typically, the groove is provided in an end face of a disk extending radially from an associated end of the first shaft.

If one of the first and second shafts is connected to the corresponding one of the input and output shafts via coupling means such as an Oldham coupling which permits eccentricity, both the input and output shafts of the steering angle ratio varying device may be supported by a common casing via fixed bearings.

If the second shaft consists of the output shaft, and the drive means consists of a mechanism adapted to move the first support member for the first shaft relative to the second support member which is fixed, a highly simple and compact design of the steering system can be attained.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
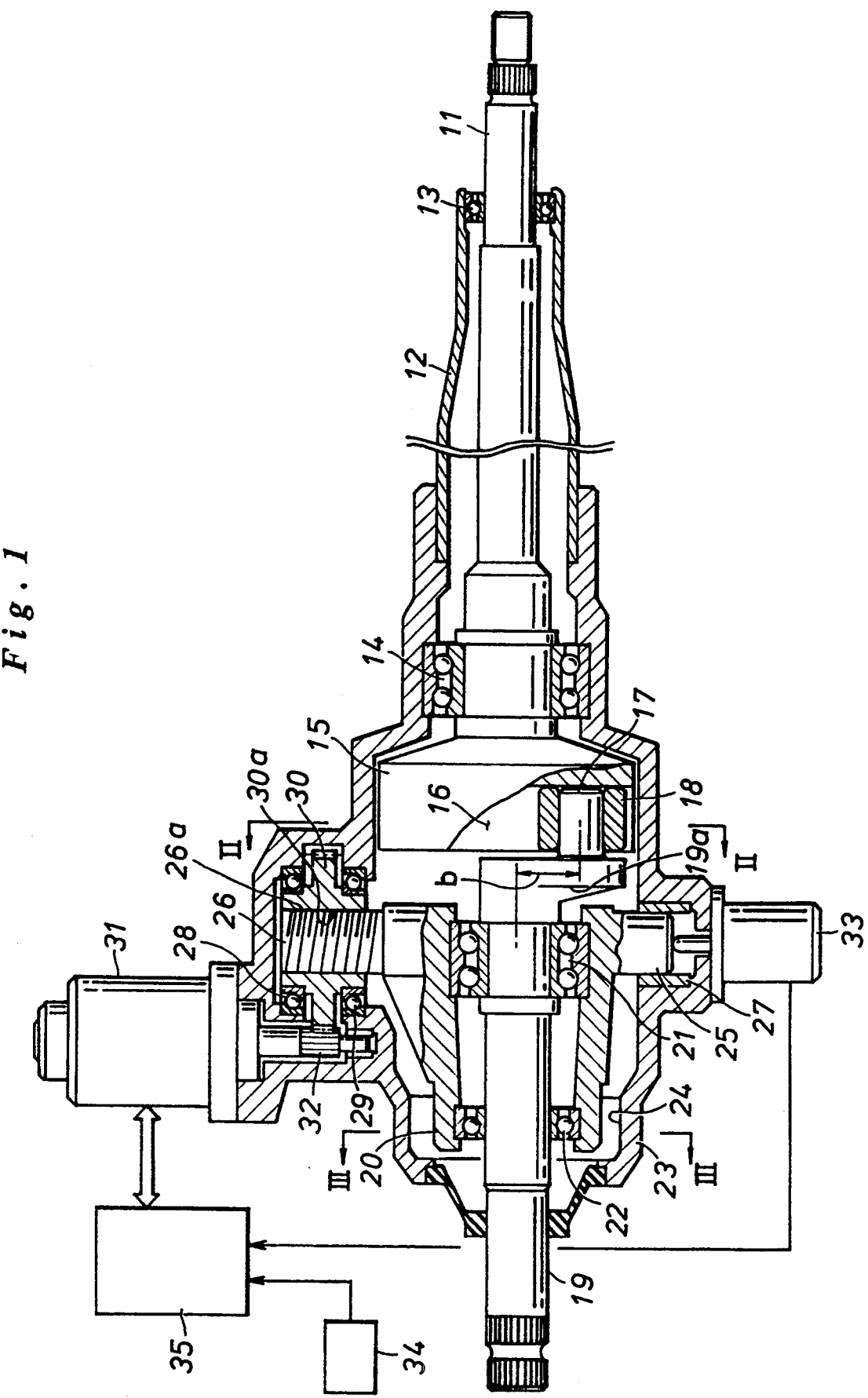
FIG. 1 is sectional view of the structure of an embodiment of the steering angle ratio varying device according to the present invention.

FIG. 1 shows a first embodiment of the present invention. In FIG. 1, an input shaft 11 or a first shaft connected to a steering wheel 1 is rotatably supported by a steering column 12 via ball bearings 13 and 14.

The left end of the input shaft 11 is integrally formed with a circular disk 15 which is provided with a slot 16 passing diagonally through the central axial line of the input shaft 11, and extending perpendicularly to the input shaft 11.

Figure 2:
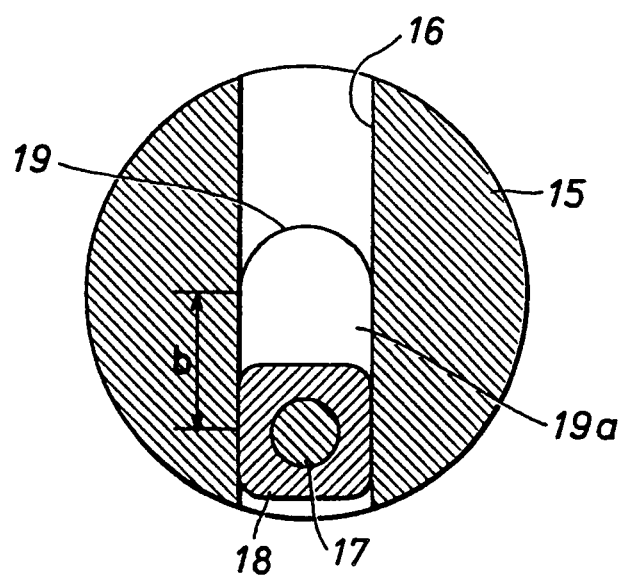
FIG. 2 is a sectional view taken along line II—II of FIG. 1.

Referring also to FIG. 2, in the slot 16 is engaged, via a slider 18, a crank pin 17 which integrally projects from an axial end of an output shaft 19 or a second shaft, via a crank arm 19a, in parallel with and radially offset (by a distance b) from the axial center line of the output shaft 19. The output shaft 19 is rotatably supported by a substantially tubular support member 20 via ball bearings 21 and 22, and extends in parallel with the input shaft 11.

Figure 3:
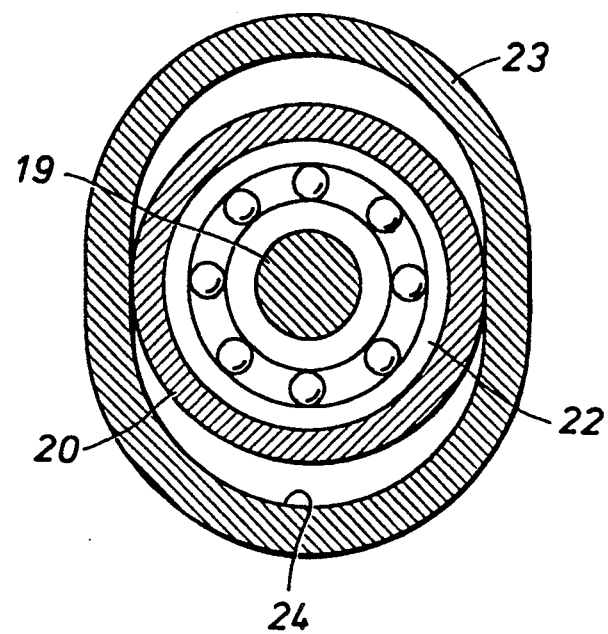
FIG. 3 is a sectional view taken along line III—III of FIG. 1.

Referring also to FIG. 3, the left end of the support member 20 is slidably engaged by a slot 24 formed in a casing 23 integrally formed at the left end of the steering column 12. The right end of the support member 20 is supported by the inner surface of the casing 23 by a pair of support pins 25 and 26 projecting radially and diagonally from the support member 20. One of the support pins 25 is slidably engaged by a slide bearing 27 provided in the casing 23 in an axially slidable manner. The other support pin 26 is formed with an external thread 26a, and is threadingly engaged by an internal thread 30a provided in a central part of a spur gear 30 rotatably supported by the casing 23 via ball bearings 28 and 29.

The spur gear 30 meshes with a pinion 32 which is rotatively driven by an electric motor 31 so that the support member 20 can be moved in a direction perpendicular to the axial line of the input shaft 11 by actuating the electric motor 31. Because the support member 20 is thus moved without changing its attitude relative to the casing 23, the input shaft 11, the output shaft 19 and the crank pin 17 are always kept in parallel with each other during such a movement of the support member 23.

The electric motor 31 is feed-back controlled by a control unit 35 which receives a signal on the displacement of the support member 20 or the amount of the eccentricity of the output shaft 19 supported by the support member 20 relative to the input shaft 11 produced by a displacement sensor 33 provided in the axial end of one of the support pins 25 and a travelling speed signal produced by a vehicle speed sensor 34, and makes the actual eccentricity obtained from the displacement sensor 33 agree with a target eccentricity given in dependence on the travelling speed of the vehicle.

The other axial end of the output shaft 19 is connected to a pinion of a rack and pinion mechanism via a universal joint and a connecting shaft. More specifically, this device is mounted in a part indicated by symbol V in FIG. 8.

Figure 4:
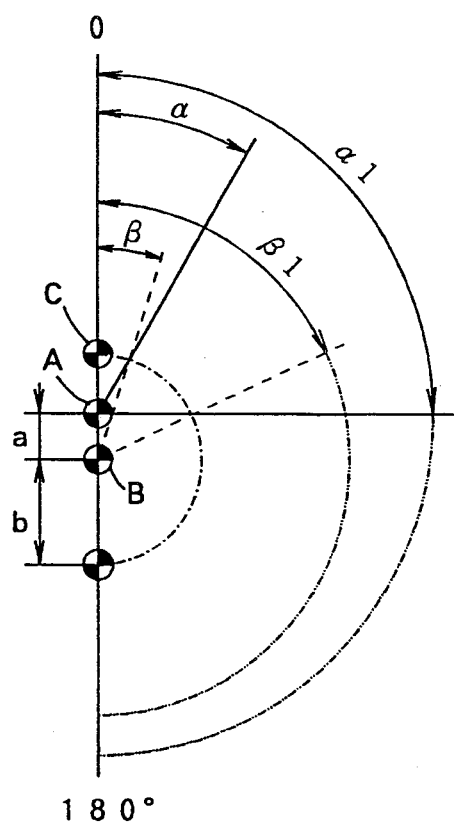
FIG. 4 is a diagram for illustrating the working principle of the present invention.

Now the working principle of this embodiment is described in the following with reference to FIG. 4. It is assumed that the rotational center of the input shaft 11 is given by A, the rotational center of the output shaft 19 is given by B, the point of action of the crank pin 17 is given by C, the dimension between the points B and C is given by b, the eccentricity between the input shaft 11 and the output shaft 19 (the dimension between the points A and B) is given by a, the rotational angle of the input shaft 11 or the steering angle of the steering wheel is given by $\alpha$, and the rotational angle of the output shaft 19 or the rotational angle of the pinion is given by $\beta$, then $$b \sin\beta = (b \cos \beta - a) \tan \alpha$$

Hence $$\alpha = \tan^{-1}\{b \sin \beta/(b \cos \beta - a)\}$$

Figure 5:
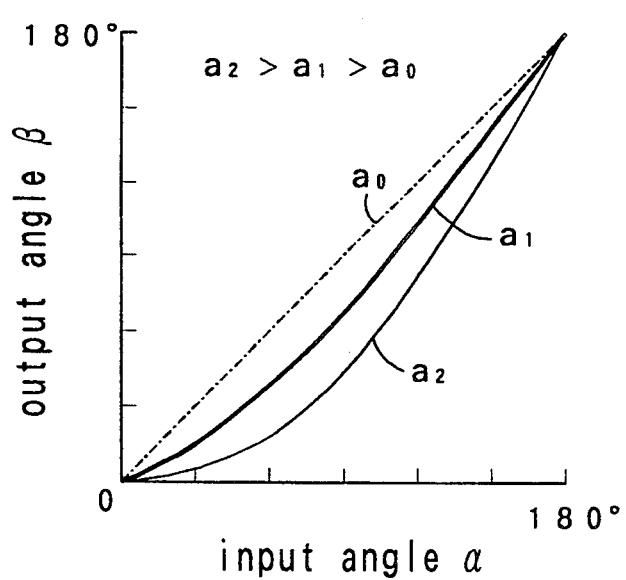
FIG. 5 is a graph showing the steering angle property of the device of the present invention.

When the input shaft 11 is turned, the crank pin 17 which is engaged in the slot 16 of the circular disk 15 of the input shaft 11 turns around the central axial line of the output shaft 19 in the manner of a crank. If the eccentricity a between the input shaft 11 and the output shaft 19 is appropriately determined, the angular speeds of the input shaft 11 and the output shaft 15 are different from each other. Furthermore, the change in the angle of the output shaft 19 for a given increment of the angular displacement of the input shaft 11 increases progressively (refer to the bold line a1 and the fine line a2 of FIG. 5).

Figure 9:
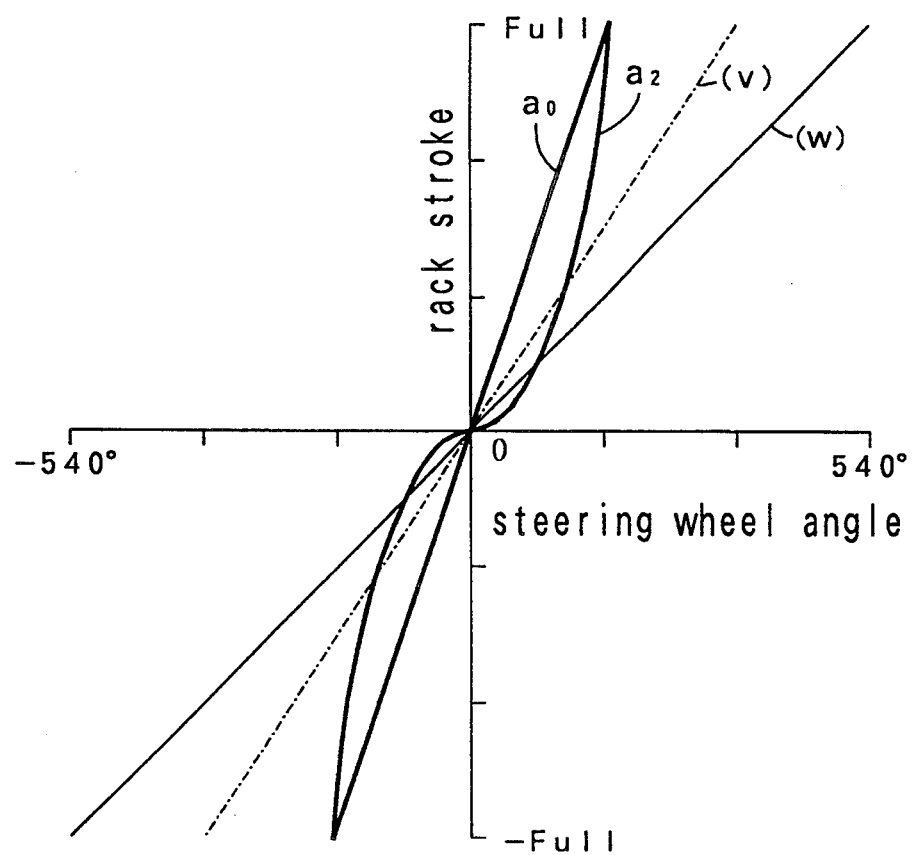
FIG. 9 is a graph showing different steering angle properties.

If the eccentricity a between the input shaft 11 and the output shaft 19 is continually changed over the range of $a_2$ to $a_0$ ($a_2 \leq a_1 \leq a_0$), the ratio of the rotational angle of the output shaft 19 to the rotational angle of the input shaft ($\beta/\alpha$) or the practical steering angle ratio can be continually changed. When the eccentricity a between the input shaft and the output shaft is increased, the rate of increase of the output angle $\beta$ for a given change in the input angle $\alpha$ increases. If the eccentricity a between the input and output shafts is zero, the input angle $\alpha$ becomes equal to the output angle $\beta$ as indicated by the one-dot chain line $a_0$ of FIG. 5. When the change in the steering angle ratio is controlled in such a manner that the curve shifts toward the curve $a_0$ in a low speed range and toward the curve $a_2$ in a high speed range, the steering angle property can be gradually changed over the range indicated by the bold line in FIG. 9. Thus, a relatively sensitive (sharp) property can be achieved in a low speed range by increasing the rack stroke for a given input angle of the steering wheel while a relatively insensitive (stable) property can be achieved in a high speed range by decreasing the rack stroke for a given input angle of the steering wheel.

Figure 10:
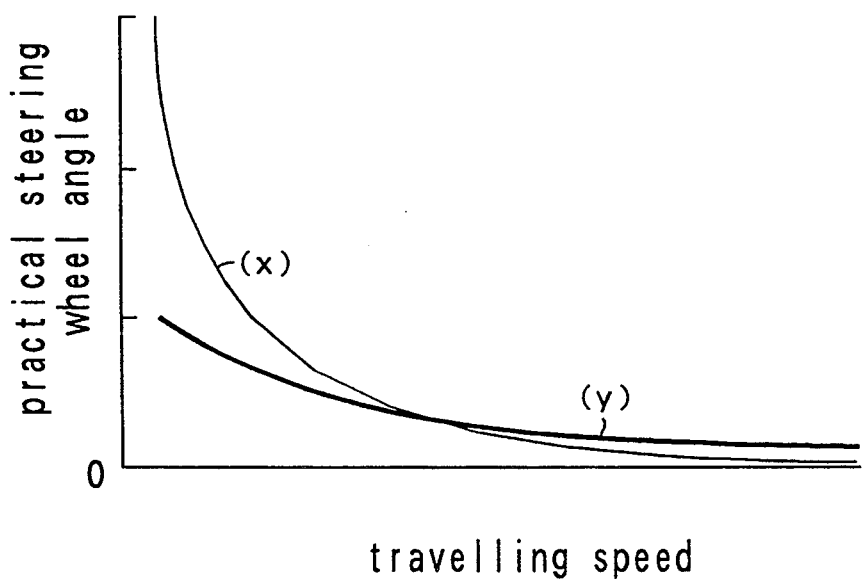
FIG. 10 is a graph showing the relationship between the vehicle speed and the practical steering wheel angle.

Therefore, the relationship between the practical steering angle of the steerable wheels and the vehicle speed can be made relatively flat as indicated by the bold line y in FIG. 10.

Figure 6:
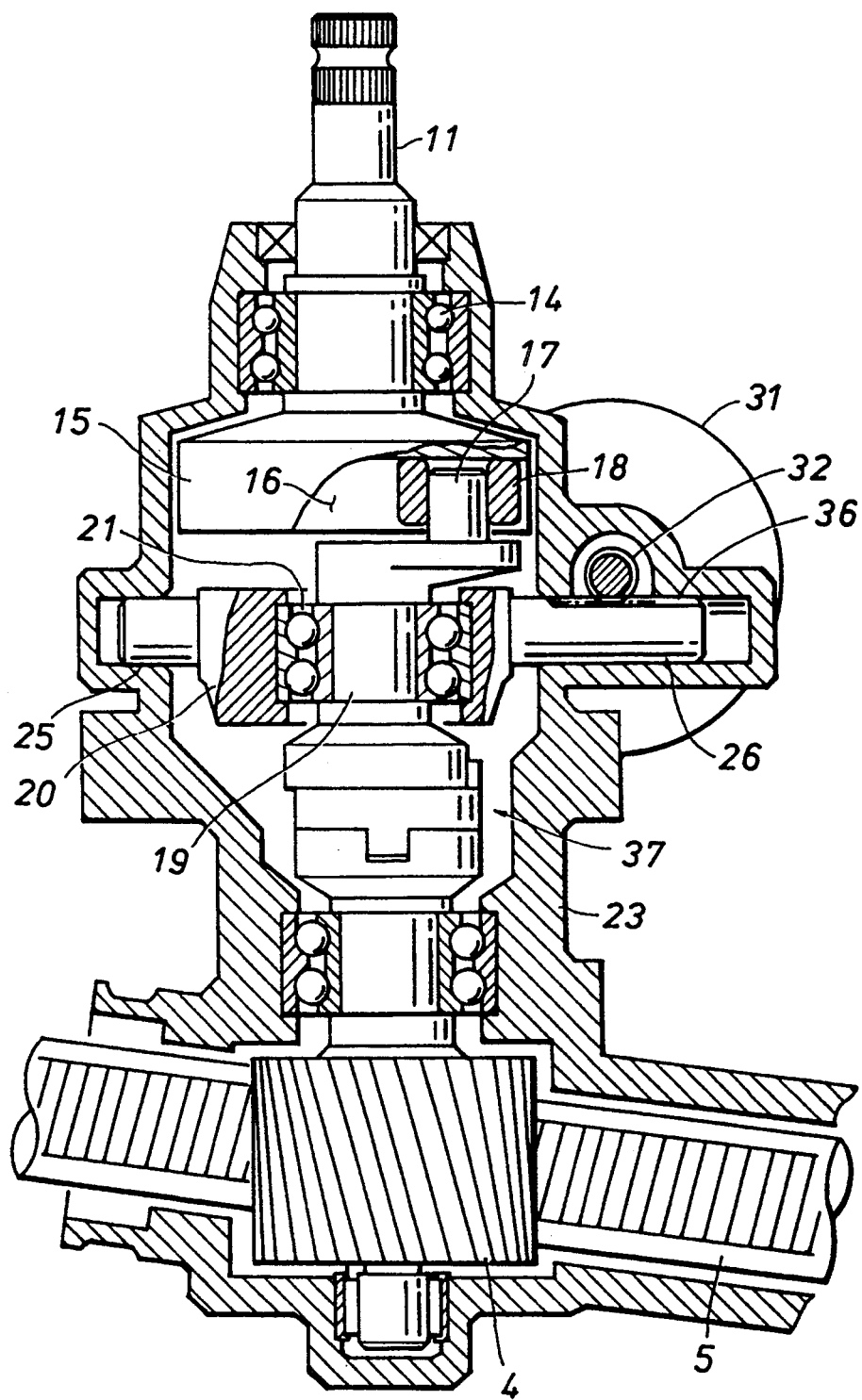
FIG. 6 is a sectional view similar to FIG. 1 showing a second embodiment of the present invention.

Now the second embodiment of the present invention is described in the following with reference to FIG. 6. The parts corresponding to those of the previous embodiment are denoted with like numerals, and the description thereof is omitted. In this embodiment, the other support pin 26 is provided with rack teeth 36, and the output shaft 19 is moved by meshing a pinion 32, which is directly connected to an electric motor 31 similar to the one used in the first embodiment, with the rack teeth 36.

The terminal end of the output shaft 19, whose eccentricity relative to the input shaft 11 changes in a similar manner as the first embodiment, is connected to the pinion 4 of the rack and pinion mechanism via an Oldham coupling 37. In other words, the device of the present embodiment is mounted in the part of FIG. 8 indicated by symbol V.

In this embodiment, because the rack and pinion mechanism connected to the steerable wheels can be integrally combined with the mechanism for changing the eccentricity of the output shaft, the various component parts can be readily placed in their neutral positions, and the steering ratio varying device can be made both compact and easy to mount. Furthermore, it will allow the use of the conventional mechanism for absorbing the impact to the steering column. In other words, both the input and output shafts of the steering angle ratio varying device may be supported by a common casing via fixed bearings.

Figure 7:
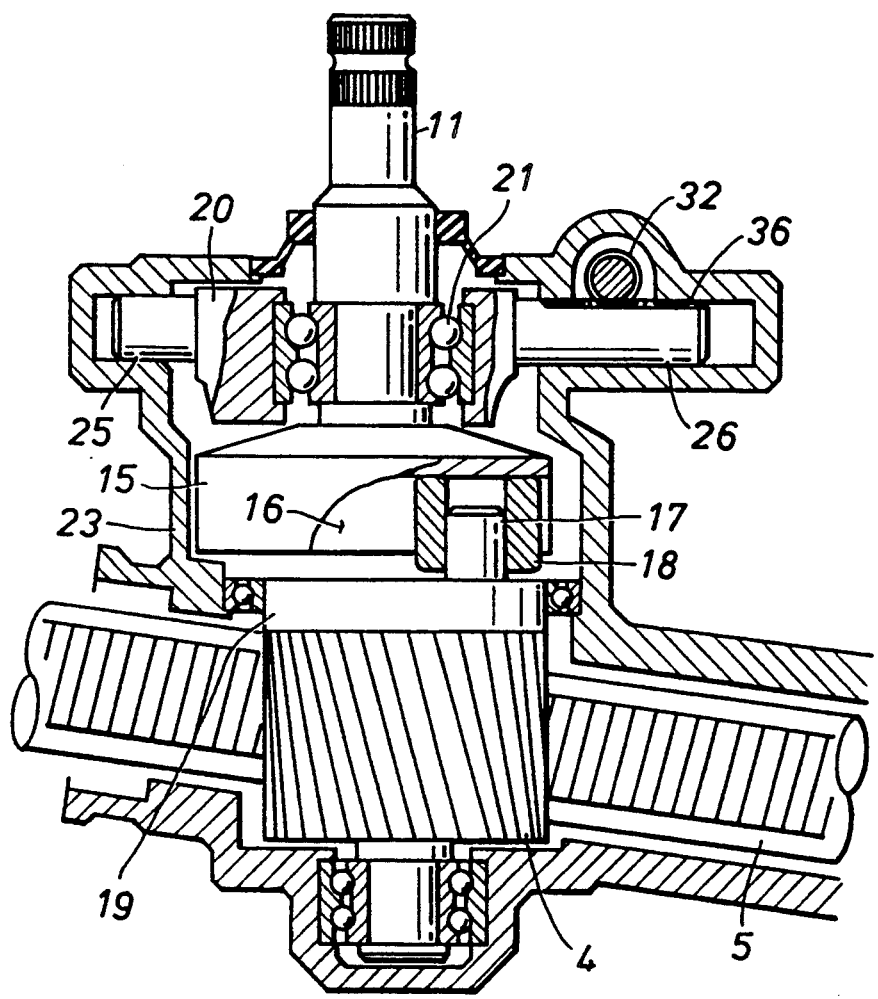
FIG. 7 is a sectional view similar to FIG. 1 showing a third embodiment of the present invention.

Now the third embodiment of the present invention is described in the following with reference to FIG. 7. The parts corresponding to those of the previous embodiments are denoted with like numerals, and the description thereof is omitted. In this embodiment, similar to the second embodiment, the input shaft 11 is supported, via a ball bearing 21, by a support member 20 which is moved by an electric motor 31, and its eccentricity relative to the crank pin 17 eccentrically projecting from the output shaft 19 can be continually varied while the axial position of the output shaft 19 relatively to the casing 23 is fixed. The output shaft 19 is integrally provided with the pinion 4 of the rack and pinion mechanism.

Figure 8:
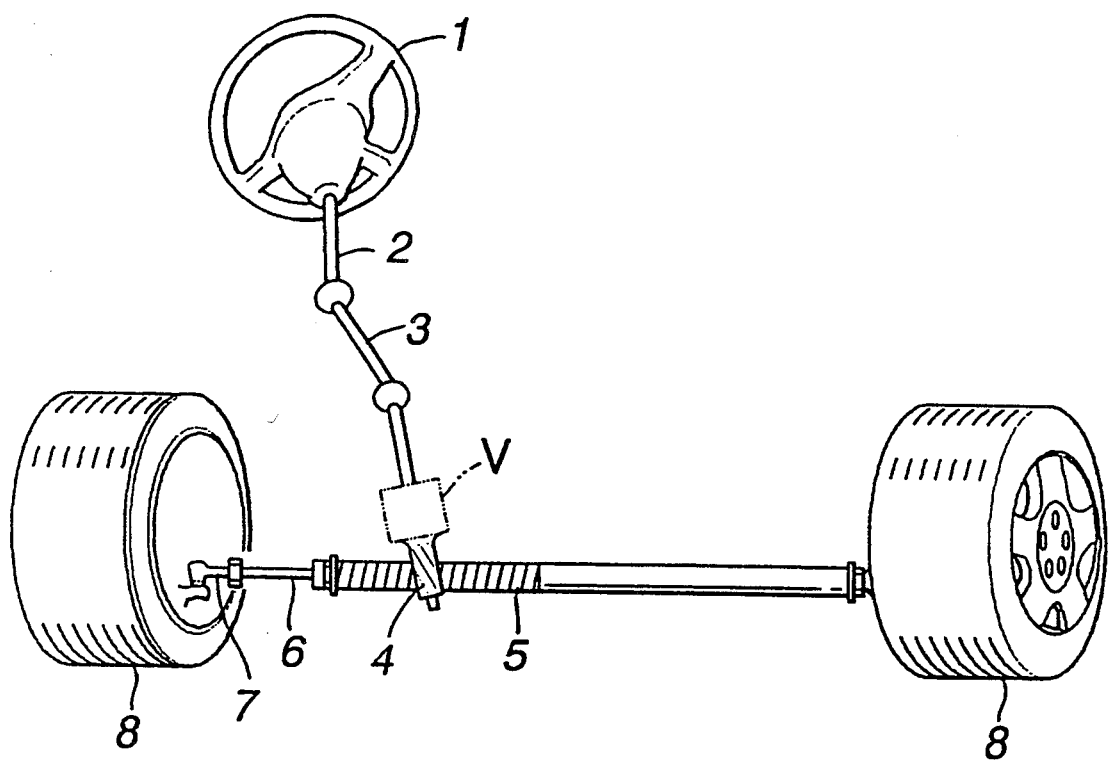
FIG. 8 is a schematic diagram showing a conventional steering device for a vehicle.

In this embodiment also, the device of the present embodiment is mounted in the part of FIG. 8 indicated by symbol V. However, according to this embodiment, the Oldham coupling can be omitted because the continual change in the eccentricity of the input shaft 11 can be accommodated by the angular movement of the connecting shaft 3 including a universal joint. Therefore, this embodiment offers not only the advantages of the second embodiment but also an improvement in durability through elimination of sliding parts and an even more compact design through reduction in the number of component parts.

In the above described embodiments, the first shaft 11 was considered as the input shaft while the second shaft 19 was considered as the output shaft. However, the non-linear transmission property between the input and output shafts can be achieved even when the second shaft 19 is the input shaft and the first shaft 11 is the output shaft by suitably determining the positions of the axial center lines of the first and second shafts and the radial distances of the point of engagement between them as measured from their axial center lines.

According to such a structure of the present invention, because a nonlinear relationship can be established between the input angle and the output angle by a purely mechanical power transmission device, a favorable maneuverability when parking the vehicle, a responsive handling of the vehicle in a low to medium speed range, and a stable behavior in a high speed range can be obtained with an extremely simple structure.

Although the present invention has been described in terms of the preferred embodiments thereof, it is obvious to a person skilled in the art that various alterations and modifications are possible without departing from the scope of the present invention which is set forth in the appended claims.

What we claim is:

1. A steering angle ratio varying device for a vehicle adapted to be connected between an input shaft for applying a steering input and an output shaft from which a steering output is obtained, comprising:

a first shaft rotatably supported by a first support member;

a second shaft rotatably supported by a second support member in parallel relationship to said first shaft;

adjustment means for moving said second support member relative to said first support member so that an axial center line of said second shaft may be moveable laterally in a plane containing an axial center line of said first shaft while maintaining both of said axial center lines in parallel with each other; and crank arm means which transmits angular movement of one of said first and second shafts to the other at a point radially offset from said axial center lines of said first and second shafts.

2. A steering angle ratio varying device for a vehicle according to claim 1, wherein said crank arm means comprises a crank pin extending integrally from and in parallel with said second shaft, and a diagonal groove provided in an associated end face of said first shaft and slidably receiving said crank pin substantially without any play.

3. A steering angle ratio varying device for a vehicle according to claim 2, wherein said groove is provided in an end face of a disk extending radially from an associated end of said first shaft.

4. A steering angle ratio varying device for a vehicle according to claim 1, wherein one of said first and second shafts is connected to said corresponding one of said input and output shafts via coupling means which permits eccentricity.

5. A steering angle ratio varying device for a vehicle according to claim 4, wherein said coupling means consists of an Oldham coupling.

6. A steering angle ratio varying device for a vehicle according to claim 1, wherein said second shaft consists of said output shaft, and said drive means consists of a mechanism adapted to move said first support member for said first shaft relative to said second support member which is fixed.

* * * * *

UNITED STATES PATENT AND TRADEMARK OFFICE
CERTIFICATE OF CORRECTION

PATENT NO. : 5,386,879

DATED : February 7, 1995

INVENTOR(S) : SHIMIZU

It is certified that error appears in the above-identified patent and that said Letters Patent is hereby corrected as shown below:

Title page, [75], delete "Tasuo" and substitute therefor --Yasuo".

Signed and Sealed this

Twenty-fourth Day of October, 1995

Attest:

BRUCE LEHMAN

Attesting Officer

Commissioner of Patents and Trademarks